(12) United States Patent
Kallela et al.

(10) Patent No.: US 7,013,411 B2
(45) Date of Patent: Mar. 14, 2006

(54) METHOD FOR THE AUTOMATED GENERATION OF A FAULT TREE STRUCTURE

(75) Inventors: Jari Kallela, Espoo (FI); Gerhard Vollmar, Meckenheim (DE); Szaniszlo Szöke, Gesves (BE)

(73) Assignee: ABB Research Ltd., Zurich (CH)

( * ) Notice: Subject to any disclaimer, the term of this patent is extended or adjusted under 35 U.S.C. 154(b) by 438 days.

(21) Appl. No.: 10/209,384

(22) Filed: Jul. 29, 2002

(65) Prior Publication Data

US 2003/0028823 A1 Feb. 6, 2003

Related U.S. Application Data

(63) Continuation of application No. PCT/EP00/00714, filed on Jan. 29, 2000.

(51) Int. Cl.
*G06F 11/00* (2006.01)

(52) U.S. Cl. .......................... 714/47; 714/26; 714/57; 702/185

(58) Field of Classification Search .................. 714/47, 714/57
See application file for complete search history.

(56) References Cited

U.S. PATENT DOCUMENTS

| | | | | |
|---|---|---|---|---|
| 4,632,802 A | * | 12/1986 | Herbst et al. ................ 376/216 |
| 5,067,099 A | * | 11/1991 | McCown et al. ............ 702/183 |
| 5,305,426 A | | 4/1994 | Ushioda et al. |
| 5,369,756 A | * | 11/1994 | Imura et al. .................... 714/26 |
| 5,544,308 A | * | 8/1996 | Giordano et al. .............. 714/26 |
| 5,566,092 A | * | 10/1996 | Wang et al. ................. 702/185 |
| 5,596,712 A | * | 1/1997 | Tsuyama et al. ............... 714/26 |
| 5,926,621 A | * | 7/1999 | Schwarz et al. ............... 714/26 |
| 2002/0166082 A1 | * | 11/2002 | Ramadei et al. .............. 714/37 |
| 2003/0070108 A1 | * | 4/2003 | Groen et al. .................... 714/1 |
| 2004/0078736 A1 | * | 4/2004 | Liggesmeyer et al. ........ 714/57 |
| 2005/0015217 A1 | * | 1/2005 | Weidl et al. ................. 702/185 |

OTHER PUBLICATIONS

A.G.T. Raaphorst et al.: "Automated Fault-Tree Generation for Operational Fault Diagnosis," International Conference on Electric Railways in a United Europe, Mar. 27-30, 1995, Amsterdam, Netherlands, p. 173-177.*

(Continued)

*Primary Examiner*—Robert Beausoliel
*Assistant Examiner*—Philip Guyton
(74) *Attorney, Agent, or Firm*—Laurence A. Greenberg; Werner H. Stemer; Ralph E. Locher

(57) ABSTRACT

A method for automated generation of an extended fault tree structure adapted to a production installation or a specific installation is used within a system determining the effectiveness and analyzing causes of faults. Generation takes place using a data processor and stored programs for carrying out functions of a hypothesis verifier, a fault data classifier, and a hypothesis configurer, and also based upon a prescribed general hierarchical fault tree structure produced by accessing data of a data server with the verifier, from which it derives fault events according to execution requirements of the verification script and stores these fault events, possibly together with previously entered fault events, in a fault database. At prescribable time intervals, the classifier carries out classification of the fault events by accessing the database, maps them as weighted causes of faults onto the tree structure, and displays or outputs the tree structure so extended.

14 Claims, 7 Drawing Sheets

OTHER PUBLICATIONS

Gabor Kocza et al.: "Automatic Fault Tree Synthesis and Real-Time Tree Trimming, Based on Computer Models," Annual Reliability and Maintainability Symposium, 1997 Proceedings, Jan. 13-16, 1997, Philadelphia, PA, USA, p. 71-75.*

Peter Liggesmeyer et al.: "Improving System Reliability With Automatic Fault Tree Generation," Twenty-Eighth Annual International Symposium on Fault-Tolerant Computing, 1998, Digest of Papers, Jun. 23-25, 1998, Munich, Germany, p. 90-99.*

Leonidas Camarinopoulos et al.: "Eine Methode zur automatischen Fehlerbaumentwicklung" [a method for an automated fault tree development], *Angewandte Informatik*, vol. 27, No. 9, Sep. 1985, pp. 389-399.

Suryaprakasa Rao Kavuri et al.: "An Interruption Tree Model To Evaluate System Performance Of Industrial Processing Complex", *1989 IEEE International Conference On Systems, Man, and Cybernetics, Conference Proceedings*, Nov. 14, 17, 1989, Cambridge, MA, pp. 1224-1225.

Bob Hansen: "Learning The Power Of Overall Equipment Effectiveness", 1999 Machinery Reliability Conference and Exposition, Apr. 12-14, 1999, Cincinnati, Ohio, pp. 19-30.

John Moubray: "Reliability-centered Maintenance", *Butterworth-Heinemann, Oxford*, $2^{nd}$ ed. , 1997, pp. 280-281, 328-334.

* cited by examiner

```
Papermaking machine fault verification
{
// Script for the verification of fault hypotheses of a papermaking machine // Verifying the fault hypotheses if( PumpOn = 0 ) then {
        newState = 3 ;    // 3  pump fault
    }
    else {
        if( WebOn = 0 ) then {
            newState = 2 ;    // 2  fibre breakage
        }
        else {
            if( RollSpeed < 20 ) then {
                newState = 1 ;    // 1 creeping speed
            }
            else {
                newState = 0 ;    // 0  undisturbed operation
            }
        }
    }

// Storing of the fault events in the fault database
    if( newState != oldState) then {
        NewClassId(Now, NewState);
        oldState = newState ;
    }
}
```

Fig. 3: VERIFICATION SCRIPT

| ID | Value | Description |
|---|---|---|
| PumpOn | 0 | Pump switched off |
| PumpOn | 1 | Pump switched on |
| WebOn | 0 | Fibre breakage in the paper |
| WebOn | 1 | Paper in order |
| RollSpeed | 65.12 | Speed of the paper roll |

Fig. 4: Data from the control system

| Time | Production area | Fault event | Case of fault | Duration |
|---|---|---|---|---|
| 01/01/1999 05:10:45 | Linie_2 | Stoppage | Washing | 00:50:30 |
| 01/01/1999 21:20:05 | Linie_1 | Fibre breakage | | 00:30:00 |
| 03/01/1999 20:20:25 | Linie_2 | Creeping | | 01:04:30 |
| 03/01/1999 22:05:05 | Linie_2 | Stoppage | Maintenance | 02:05:00 |
| 03/01/1999 22:20:55 | Linie_1 | Stoppage | Maintenance | 01:06:15 |
| 05/01/1999 00:20:10 | Linie_2 | Fibre breakage | | 00:45:10 |
| 05/01/1999 12:00:05 | Linie_2 | Fibre breakage | | 00:10:00 |

Fig. 5: Fault database

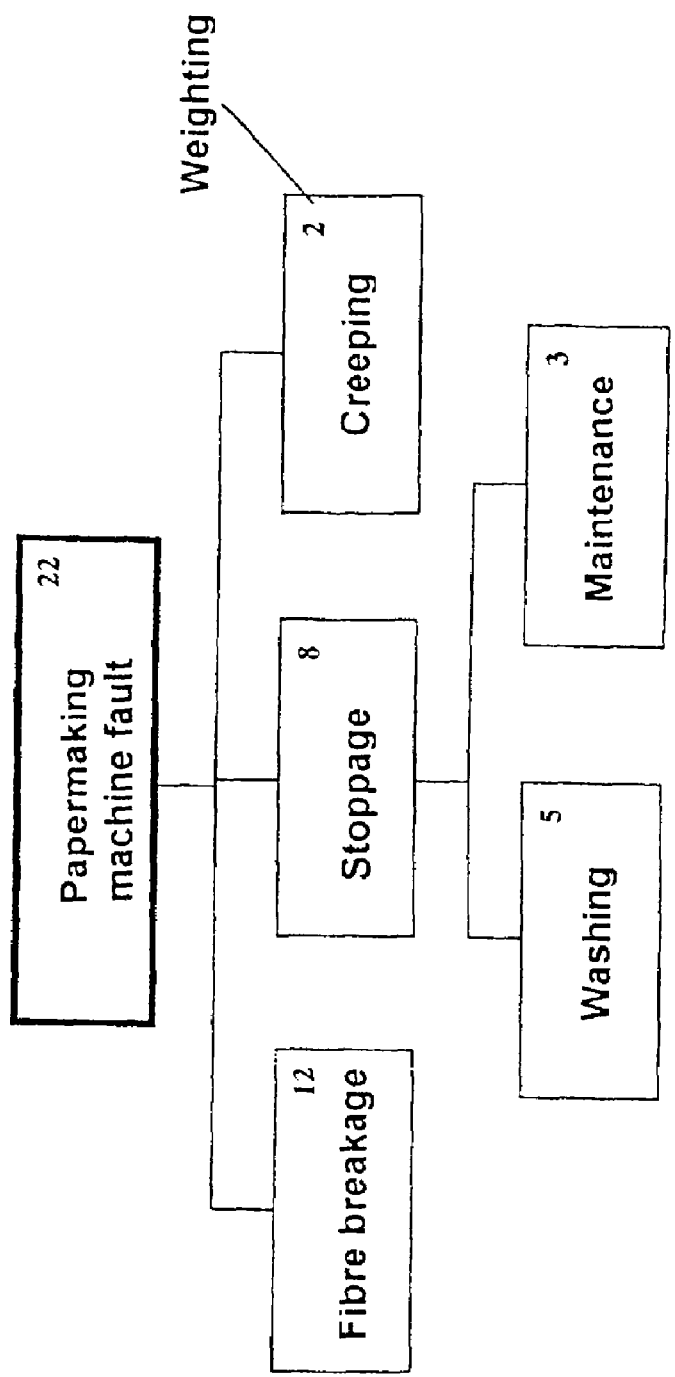
Fig. 6: Weighted fault tree

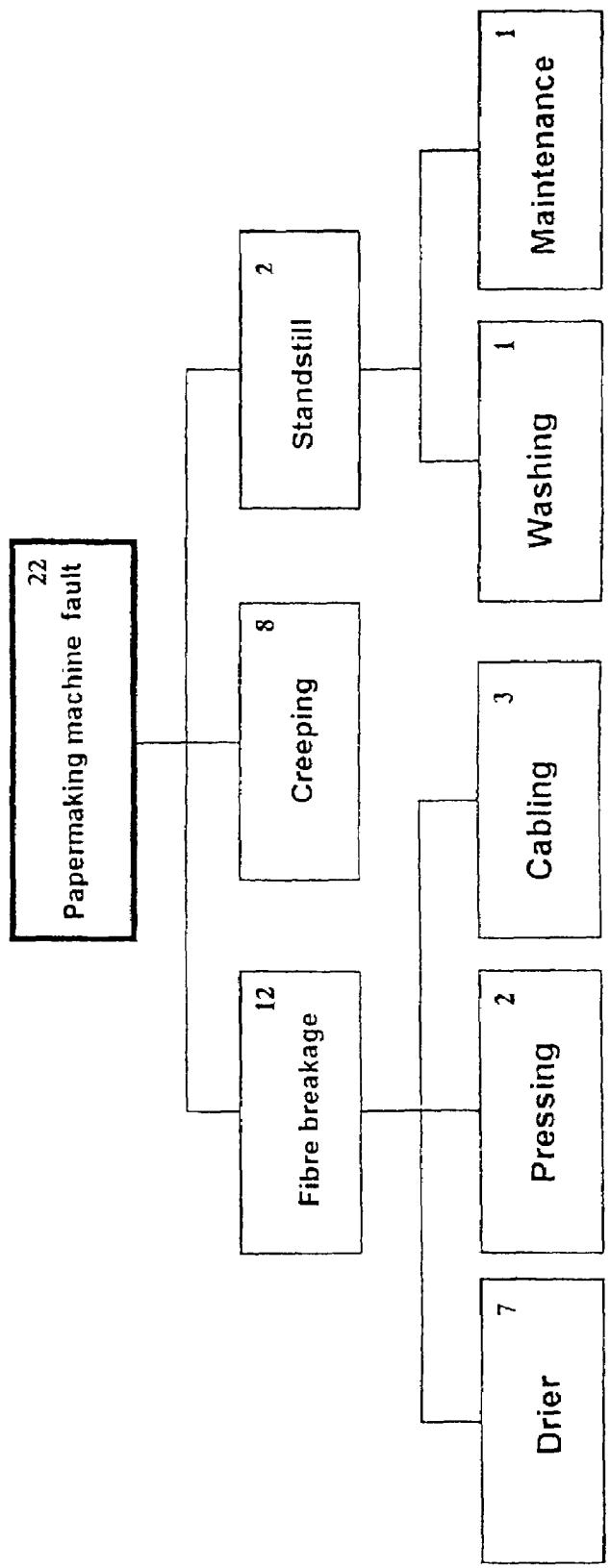
Fig. 7: Adapted fault tree

METHOD FOR THE AUTOMATED GENERATION OF A FAULT TREE STRUCTURE

CROSS-REFERENCE TO RELATED APPLICATION

This application is a continuation of copending International application No. PCT/EP00/00714, filed Jan. 29, 2000, which designated the United States and which was not published in English.

BACKGROUND OF THE INVENTION

Field of the Invention

The invention relates to a method for the automated generation of an extended fault tree structure that is adapted to a production installation type or to a specific production installation.

The method is suitable for use within a system for determining the effectiveness (Overall Equipment Effectiveness (OEE)) and thereby, in particular, for the analysis of causes of faults.

Effectiveness is understood here as the concept of Overall Equipment Effectiveness, which is described, for example, in Robert Hansen: Learning the Power of Overall Equipment Effectiveness, in the 1999 conference report Machinery Reliability Conference and Exposition, "The Meeting of Machinery Reliability Minds", April 12–14, Cincinnati, Ohio, pages 19 to 30, published by Industrial Communications, Inc., 1704 Natalie Nehs Dr., Knoxville, Tenn. 37931.

OEE is, accordingly, a method for determining a percentage that indicates to what extent the actual productivity in each case reaches a planned, that is prescribed, productivity. OEE is also referred to as the multiplication of synergistic parameters, which define the "health" of a process, to be specific OEE=availability×processing speed×quality.

For commercial reasons, and to safeguard product quality, operators of production installations have an interest in determining a desired effectiveness, which can be achieved in undisturbed operation, and comparing the effectiveness at a given time with it. If the effectiveness at a given time deviates from the desired value, this means losses in productivity. It must then be determined which fault events exist and what is causing them. The causes may have their roots in physical, human, or organizational areas.

Various methods and techniques can be used for the analysis of faults, that is, events that adversely influence the respective production objective. The most important of these are Failure Modes and Effects Analysis (FMEA), fault tree analysis, or methods of statistical evaluation, such as, for example, the Pareto analysis [John Moubray, RCM2, Butterworth-Heinemann, Second Edition 1997].

Fault tree analysis is, in principle, well suited for use within an analysis of the causes of faults. For an effective analysis of the causes of faults, however, a fault tree with a structure that is well adapted to the production installation should be available.

Such an adapted fault tree structure can be created by the evaluation of historical data from production operation. This is because, in automated production operation, information is usually stored for relatively long periods of time in history databases so that the data required are available. Data are in this case either collected directly from the associated production or machine control or from the master control system. It is also possible for the machine operator to enter information on the state of production or machine by a data acquisition system (terminal, barcode reader). It is consequently possible to store specific information on fault cases in a database.

One problem, however, is that the evaluation of the large amount of data is very laborious. Therefore, once prepared with great evaluation effort, fault trees are generally not updated. Accordingly, there is no feedback of experience from day-to-day operation.

SUMMARY OF THE INVENTION

It is accordingly an object of the invention to provide method for the automated generation of a fault tree structure that overcomes the hereinafore-mentioned disadvantages of the heretofore-known devices and methods of this general type and that makes it possible, based upon a general, unadapted fault tree structure, to generate in an automated manner an extended structure that is adapted to a specific production installation.

With the foregoing and other objects in view, there is provided, in accordance with the invention, a method for automatic generation of an extended fault tree structure adapted to one of a production installation type and a specific production installation, including the steps of providing a data processor having stored programs and data stores including a fault database, a fault tree memory, and a verification script memory, entering fault events in the fault database one of through a data input and determined from data called up from a data server, storing, with the data stores fault events in the fault database, a prescribed general hierarchical fault tree structure and the extended fault tree structure in the fault tree memory, and verification scripts for a verification of fault hypotheses in the verification script memory, generating, based upon the prescribed general hierarchical fault tree structure, the extended fault tree structure by carrying out functions of a hypothesis verifier, a fault data classifier, and a hypothesis configurer with the data processor and the stored programs, entering and altering fault hypotheses with a hypothesis editor, and producing the extended fault tree structure by the hypothesis verifier accessing data from the data server, the hypothesis verifier deriving, from the accessed data, fault events according to execution requirements of the verification scripts, the hypothesis verifier storing these fault events in the fault database, at prescribable time intervals, the fault data classifier classifying the fault events by accessing the fault database, mapping the fault events as weighted causes of faults onto the fault tree structure, and at least one of displaying the extended fault tree structure through a display device and feeding the extended fault tree structure to an output device.

In this method, verification scripts, according to the requirements of which data are called up from a data server to derive fault events from them, are prepared based upon prescribed fault hypotheses and are stored. The derived fault events are stored—possibly together with additionally entered fault events—in a fault database. A fault data classifier carries out a statistical evaluation of the stored fault events at prescribed time intervals, and maps its results as weighted causes of faults onto a stored fault tree structure.

A major advantage is that use of the method creates a system capable of learning, which brings about a continuous adaptation of a fault tree structure to respective production circumstances.

In accordance with another mode of the invention, all the steps of the method are applied in a system for determining effectiveness and for analyzing of causes of faults for the production installation type or the specific production installation.

In accordance with a further mode of the invention, the fault events are stored together with previously entered fault events in the fault database with the hypothesis verifier.

In accordance with a concomitant mode of the invention, a frequency of occurrence of given causes of faults at prescribable time intervals is automatically checked with the fault data classifier and the fault tree structure and the verification scripts are altered dependent upon a relevance of the given causes of faults so determined.

Other features that are considered as characteristic for the invention are set forth in the appended claims.

Although the invention is illustrated and described herein as embodied in method for the automated generation of a fault tree structure, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 3 is a script for verifying fault hypotheses according to the invention;

FIG. 4 is a chart illustrating typical data from a control system according to the invention;

FIG. 5 is a chart illustrating information stored in the fault database according to the invention;

FIG. 6 is a chart of a weighted fault tree structure according to the invention; and FIG. 7 is a chart of an automatically extended fault tree according to the invention.

DESCRIPTION OF THE PREFERRED EMBODIMENTS

Figure 1:
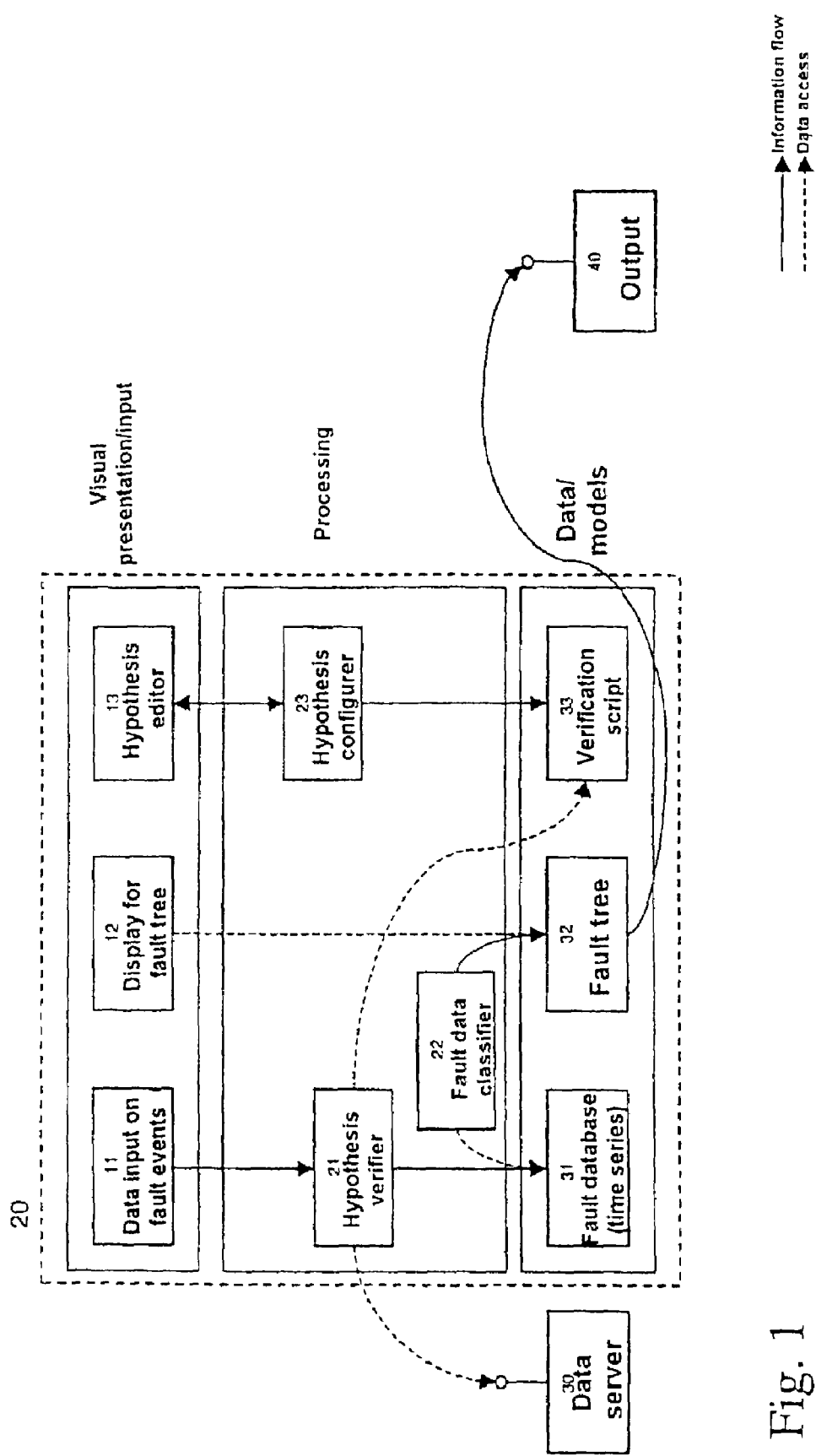
FIG. 1 is a block circuit diagram of a system for carrying out the method according to the invention.

Referring now to the figures of the drawings in detail and first, particularly to FIG. 1 thereof, there is shown a block diagram with components of a data processing device 20, which may be part of a system for determining the effectiveness of a production installation and for the analysis of causes of faults. Represented as software components for carrying out processing functions are a hypothesis verifier 21, a fault data classifier 22, and a hypothesis configurer 23. Present as data stores or memories are a fault database 31, a fault tree memory 32, and a verification script memory 33. Fault event data can be entered through a data input 11. A display device 12 makes it possible for results to be displayed. An output 40 makes it possible for the generated fault tree structure to be output or further transmitted. Fault hypotheses can be entered by a hypothesis editor 13.

Stored in advance in the fault tree memory 32 is a weighted fault tree with a simple basic structure. The structure of the fault tree and the weighting of the individual causes of faults are in each case altered in an automated manner by the result of the program runs.

The hypothesis configurer 23 is set up for preparing a verification script based upon entered fault hypotheses and storing it in the verification script memory 33.

The hypothesis verifier 21 is set up for accessing data of a data server 30 of the master control system of the production installation according to requirements of the verification script and deriving fault events from them, with additional information that concerns fault events and can be entered through the data input 11 being taken into account. It stores determined fault events in the fault database 31.

The fault data classifier 22 is set up for calling up the fault events from the fault database 31 at prescribable time intervals, classifying them, and mapping them as weighted causes of faults onto the fault tree structure.

Figure 2:
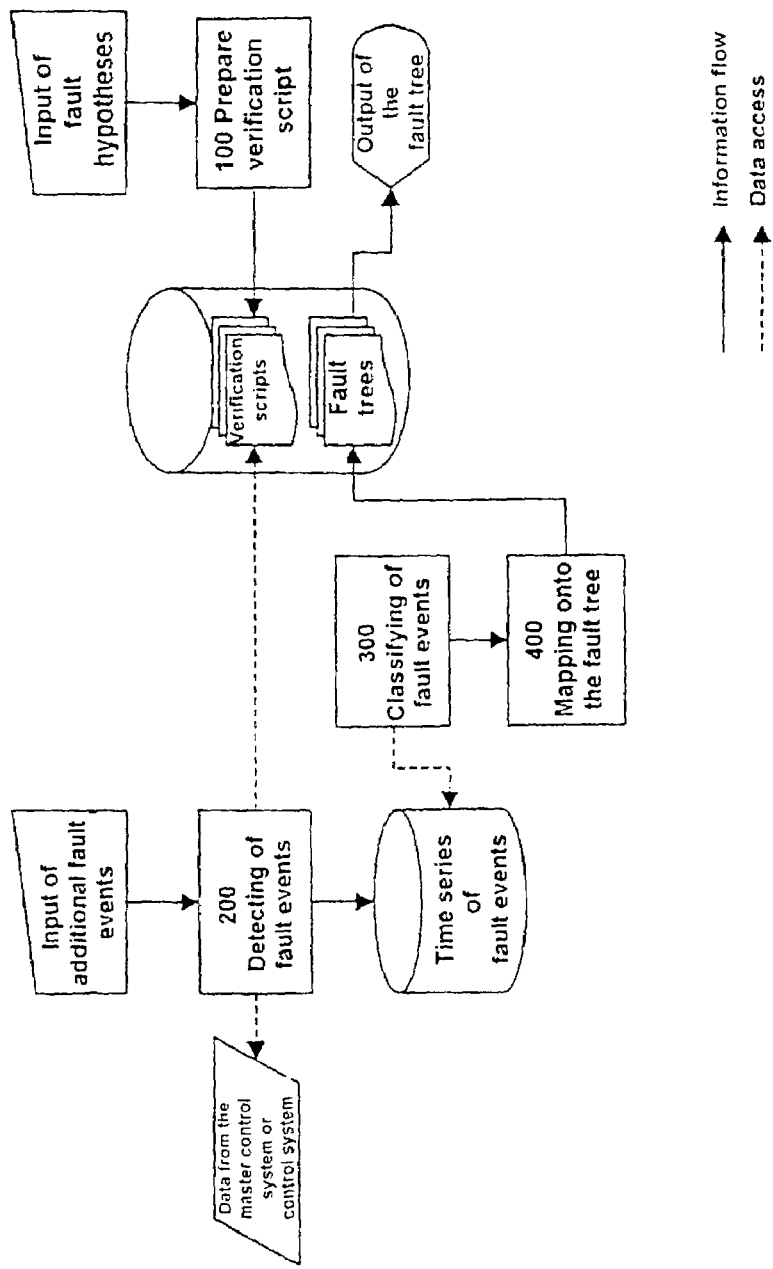
FIG. 2 is a block circuit diagram illustrating steps of the method sequence according to the invention.

FIG. 2 shows the individual steps of the method for the automated generation of an extended fault tree structure.

In step 100, the criteria for verifying fault hypotheses are entered. Base upon the criteria, an executable script is produced. FIG. 3 shows, by way of example, a script for three fault hypotheses.

In step 200, the script is cyclically applied to data from the control system or master control system. FIG. 4 shows a typical data record in this respect. These data are checked according to the criteria of the verification script. Detected fault events are stored—possibly along with additionally entered fault events—in the fault database 31.

Step 300 carries out a classification of the fault events. Either the classification takes place automatically at fixed time intervals, for example, once a month, or the user initiates the classification. The fault events are classified with regard to the frequency of occurrence.

Step 400 maps the fault events onto a logical tree structure. FIG. 6 shows a basic structure of a fault tree and FIG. 7 shows an extended fault tree.

FIG. 3 shows a script for verifying fault hypotheses of a papermaking machine. Concerned here are the fault hypotheses for a pump fault, fiber breakage, and creeping speed. If a fault is detected, the script writes status information into the fault database 31.

FIG. 4 shows typical data from a control system. In the simplest case, a data record includes an identifier (ID) for the signal and its value. Depending on the system, additional information, such as data type, descriptive data, and system time, is accessible. For verifying fault hypotheses, often signals concerning the status of the machine, counter readings, and motor speeds are inquired. For the documentation of faults, measured values of physical variables and fault-status signals are additionally helpful.

FIG. 5 shows, by way of example, information stored in the fault database. The data records are stored chronologically as histories. A data record includes a so-called time stamp (date and time of day), the production area in which the fault event occurred, the description of the fault, event, and the corresponding event category and also the duration of the event. In addition, an operator may specify a cause of a fault with respect to the fault event.

FIG. 6 shows the simple basic structure of the weighted fault tree for a papermaking machine. The papermaking machine fault has fiber breakage, stoppage, and creeping as causes. The stoppage cause has, in turn, washing and maintenance as causes of the fault. After a classification, the frequency of the occurrence of a cause of a fault can also be output as a weighting.

FIG. 7 shows the automatically extended fault tree.

The fault tree from FIG. 6 provides the basic structure. For the fiber breakage cause of a fault, a verification script of its own has been produced. The fault events detected in such a script are automatically introduced into the fault tree structure as causes for a fiber breakage fault.

We claim:

1. A method for automatic generation of an extended fault tree structure adapted to one of a production installation type and a specific production installation within a system for determining an overall equipment effectiveness for the specific production installation type or for the production installation, which comprises:
   providing a data processor having stored programs and data stores including a fault database, a fault tree memory, and a verification script memory;
   entering fault events in the fault database one of through a data input and determined from data called up from a data server;
   storing, with the data stores:
      fault events in the fault database;
      a prescribed general hierarchical fault tree structure and the extended fault tree structure in the fault tree memory; and
      verification scripts for a verification of fault hypotheses in the verification script memory;
   generating, based upon the prescribed general hierarchical fault tree structure, the extended fault tree structure by carrying out functions of a hypothesis verifier, a fault data classifier, and a hypothesis configurer with the data processor and the stored programs;
   entering and altering fault hypotheses with a hypothesis editor; and
   producing the extended fault tree structure by:
      the hypothesis verifier accessing data from the data server;
      the hypothesis verifier deriving, from the accessed data, fault events according to execution requirements of the verification scripts;
      the hypothesis verifier storing these fault events in the fault database;
      at prescribable time intervals, the fault data classifier;
         classifying the fault events by accessing the fault database;
         mapping the fault events as weighted causes of faults onto the fault tree structure; and
         at least one of;
            displaying the extended fault tree structure through a display device; and
            feeding the extended fault tree structure to an output device.

2. The method according to claim 1, which further comprises applying all steps of the method in a system for determining effectiveness and for analyzing causes of faults for the production installation type.

3. The method according to claim 1, which further comprises applying all steps of the method in a system for determining effectiveness and for analyzing causes of faults for the specific production installation type.

4. The method according to claim 1, which further comprises storing the fault events together with previously entered fault events in the fault database with the hypothesis verifier.

5. The method according to claim 1, which further comprises:
   automatically checking a frequency of occurrence of given causes of faults at prescribable time intervals with the fault data classifier; and
   altering the fault tree structure and the verification scripts dependent upon a relevance of the given causes of faults so determined.

6. The method according to claim 4, which further comprises:
   automatically checking a frequency of occurrence of given causes of faults at prescribable time intervals with the fault data classifier; and
   altering the fault tree structure and the verification scripts dependent upon a relevance of the given causes of faults so determined.

7. A method for automatic generation of an extended fault tree structure adapted to one of a production installation type and a specific production installation within a system for determining an overall equipment effectiveness for the specific production installation type or the production installation, which comprises:
   providing a data processor having stored programs and data stores including a fault database, a fault tree memory, and a verification script memory;
   entering fault events in the fault database one of through a data input and determined from data called up from a data server;
   storing, with the data stores:
      fault events in the fault database;
      a prescribed general hierarchical fault tree structure and the extended fault tree structure in the fault tree memory; and
      verification scripts for a verification of fault hypotheses in the verification script memory;
   generating, based upon the prescribe& general hierarchical fault tree structure, the extended fault tree structure by carrying out functions of a hypothesis verifier, a fault data classifier, and a hypothesis configurer with the data processor and the stored programs;
   entering and altering fault hypotheses with a hypothesis editor; and
   producing the extended fault tree structure by:
      the hypothesis verifier accessing data from the data server;
      the hypothesis verifier deriving, from the accessed data, fault events according to execution requirements of the verification scripts;
      the hypothesis verifier storing these fault events in the fault database together with previously entered fault events ;
      at prescribable time intervals, the fault data classifier:
         classifying the fault events by accessing the fault database ;
         mapping the fault events as weighted causes of faults onto the fault tree structure; and
         at least one of:
            displaying the extended fault tree structure through a display device; and
            feeding the extended fault tree structure to an output device.

8. The method according to claim 7, which further comprises applying all steps of the method in a system for determining effectiveness and for analyzing of causes of faults for the production installation type.

9. The method according to claim 7, which further comprises applying all steps of the method in a system for determining effectiveness and for analyzing of causes of faults for the specific production installation.

10. The method according to claim 7, which further comprises:
   automatically checking a frequency of occurrence of given causes of faults at prescribable time intervals with the fault data classifier; and altering the fault tree structure and the verification scripts dependent upon a relevance of the given causes of faults so determined.

11. In a system for determining effectiveness and for analyzing causes of faults, a method for automatically generating an extended fault tree structure adapted to one of a production installation type and a specific production installation, which comprises:

providing a data processor having stored programs and data stores including a fault database, a fault tree memory, and a verification script memory;

entering fault events in the fault database one of through a data input and determined from data called up from a data server;

storing, with the data stores:
fault events in the fault database;
a prescribed general hierarchical fault tree structure and the extended fault tree structure in the fault tree memory; and
verification scripts for a verification of fault hypotheses in the verification script memory;

generating, based upon the prescribed general hierarchical fault tree structure, the extended fault tree structure by carrying out functions of a hypothesis verifier, a fault data classifier, and a hypothesis configurer with the data processor and the stored programs;

entering and altering fault hypotheses with a hypothesis editor; and producing the extended fault tree structure by:
the hypothesis verifier accessing data from the data server;
the hypothesis verifier deriving, from the accessed data, fault events according to execution requirements of the verification scripts;
the hypothesis verifier storing these fault events in the fault database;
at prescribable time intervals, the fault data classifier:
classifying the fault events by accessing the fault database;
mapping the fault events as weighted causes of faults onto the fault tree structure; and at least one of:
displaying the extended fault tree structure through a display device; and
feeding the extended fault tree structure to an output device.

12. The method according to claim 11, which further comprises storing the fault events together with previously entered fault events in the fault database with the hypothesis verifier.

13. The method according to claim 11, which further comprises:
automatically checking a frequency of occurrence of given causes of faults at prescribable time intervals with the fault data classifier; and
altering the fault tree structure and the verification scripts dependent upon a relevance of the given causes of faults so determined.

14. The method according to claim 12, which further comprises:
automatically checking a frequency of occurrence of given causes of faults at prescribable time intervals with the fault data classifier; and
altering the fault tree structure and the verification scripts dependent upon a relevance of the given causes of faults so determined.

* * * * *